July 25, 1939.  E. S. HINELINE  2,167,435
RANGE AND VIEW FINDER AND CAMERA MECHANISM FUNCTIONALLY EQUIPPED THEREWITH
Filed July 23, 1937  6 Sheets-Sheet 1
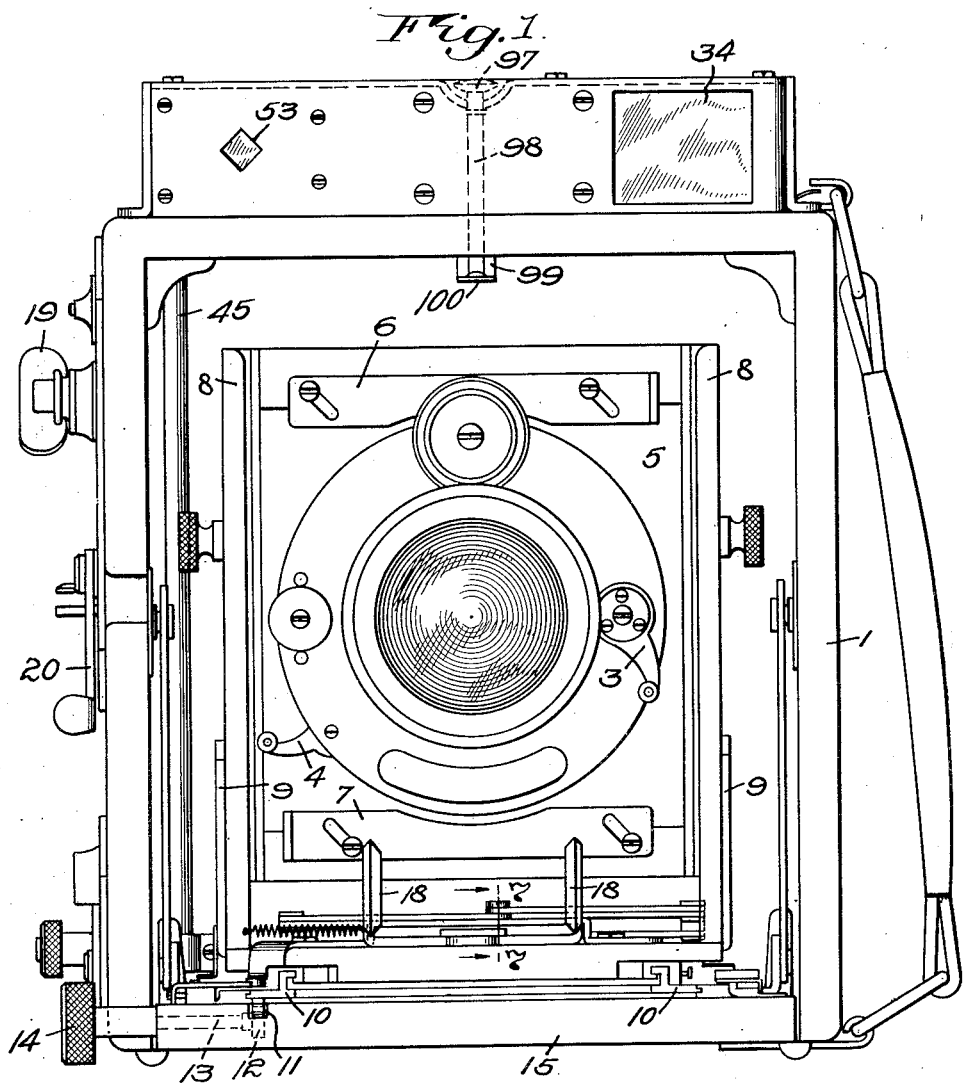
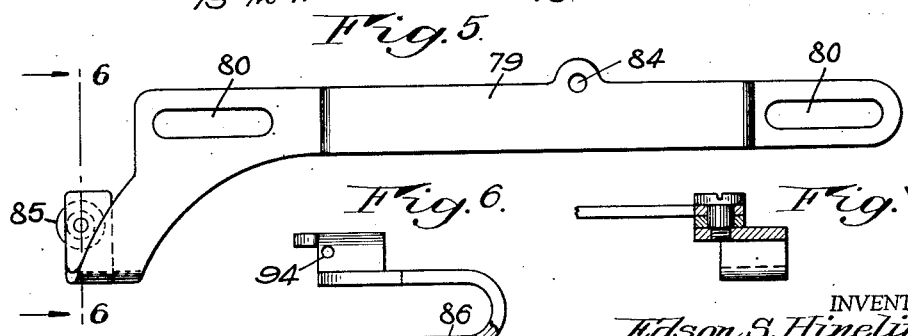
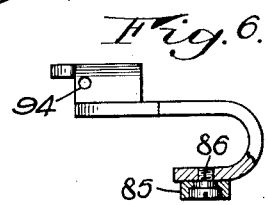
INVENTOR.
Edson S. Hineline
BY
his ATTORNEYS

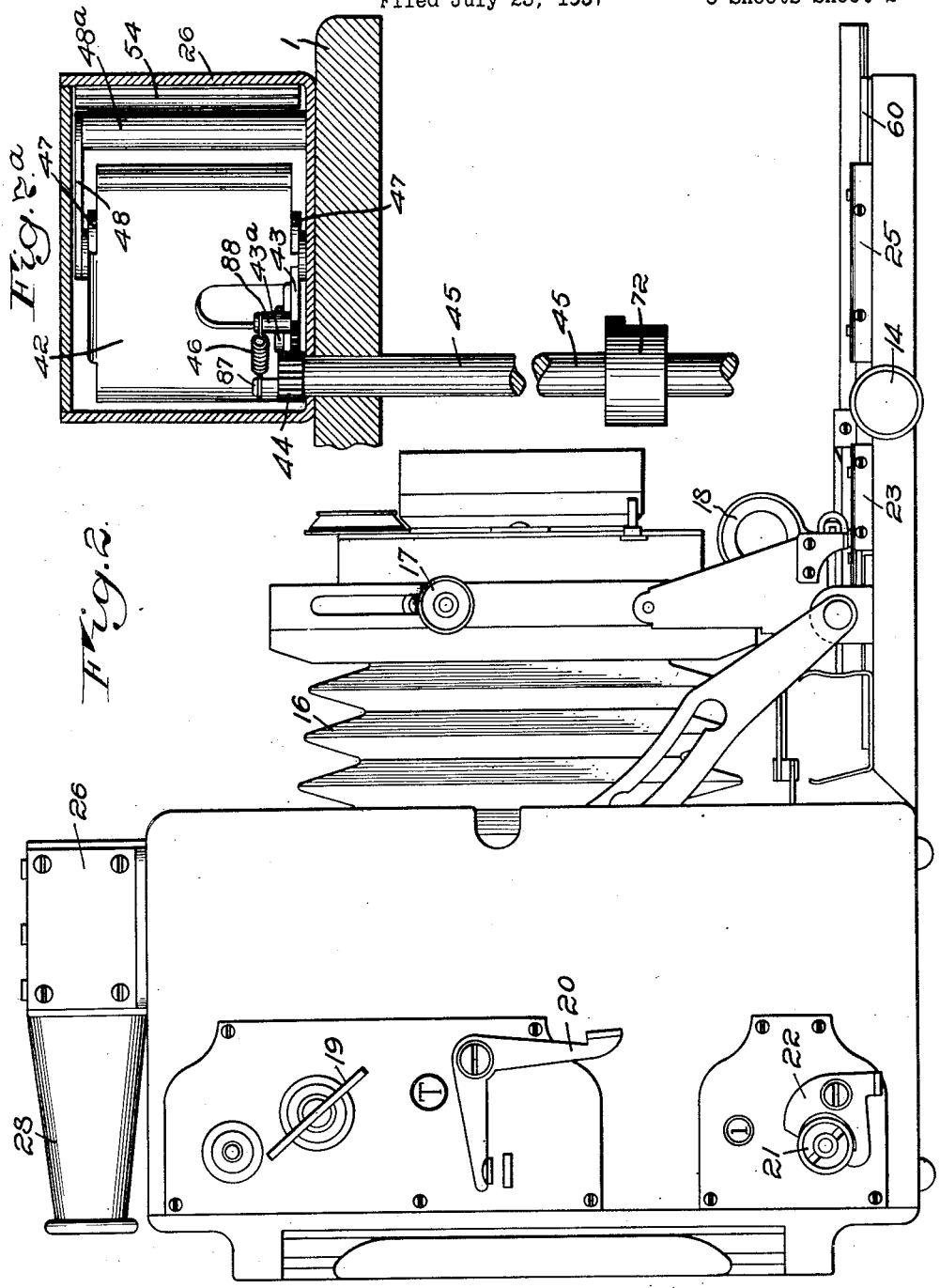

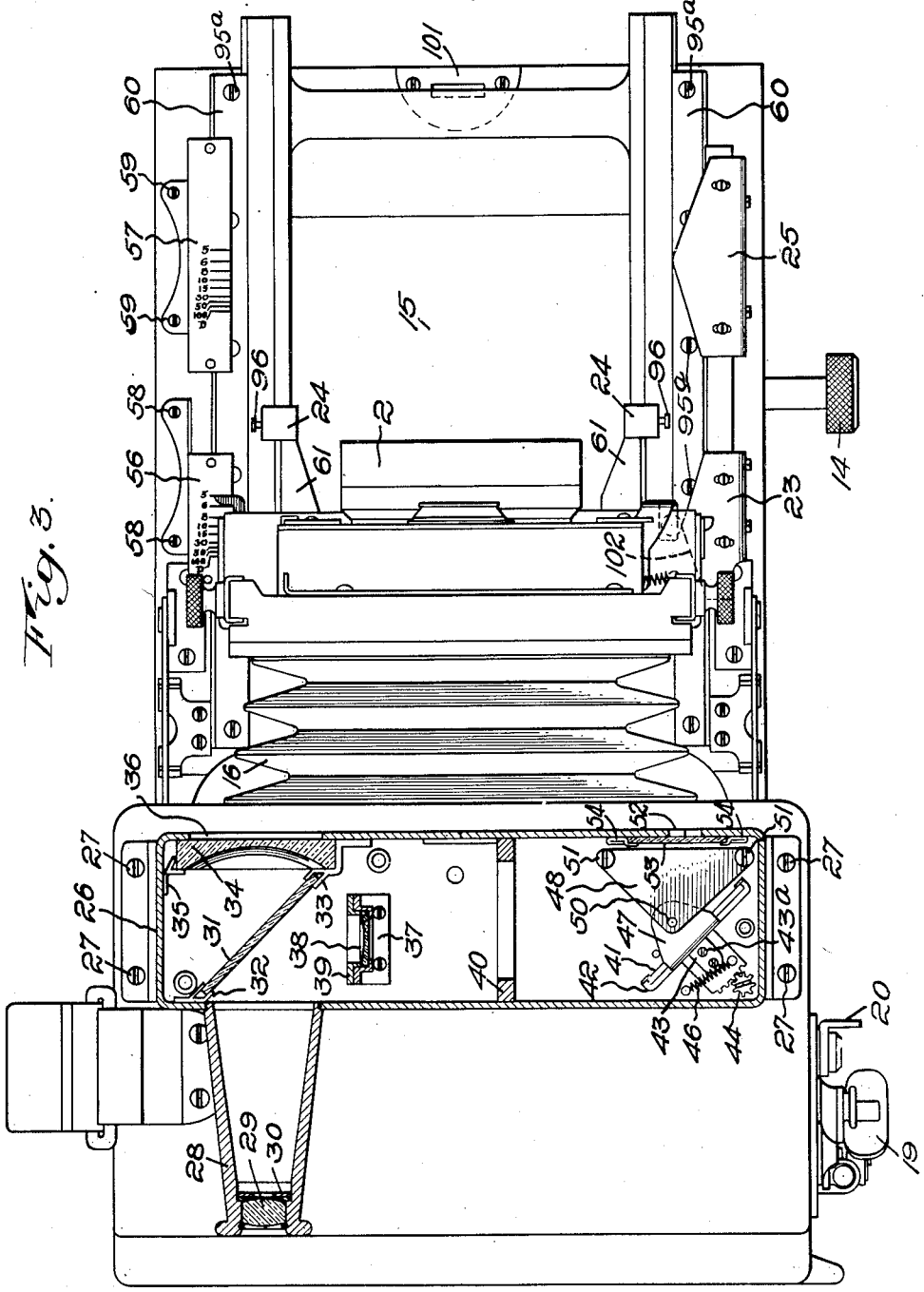

July 25, 1939.  E. S. HINELINE  2,167,435
RANGE AND VIEW FINDER AND CAMERA MECHANISM FUNCTIONALLY EQUIPPED THEREWITH
Filed July 23, 1937  6 Sheets-Sheet 4

INVENTOR.
Edson S. Hineline
BY
his ATTORNEYS

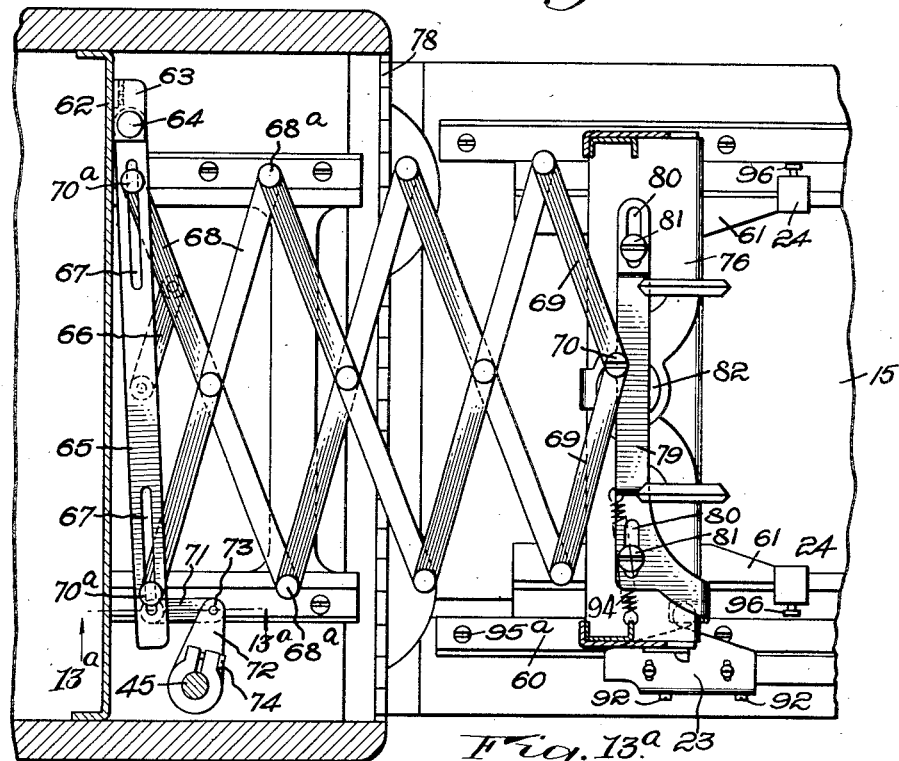

July 25, 1939.  E. S. HINELINE  2,167,435
RANGE AND VIEW FINDER AND CAMERA MECHANISM FUNCTIONALLY EQUIPPED THEREWITH
Filed July 23, 1937  6 Sheets-Sheet 6
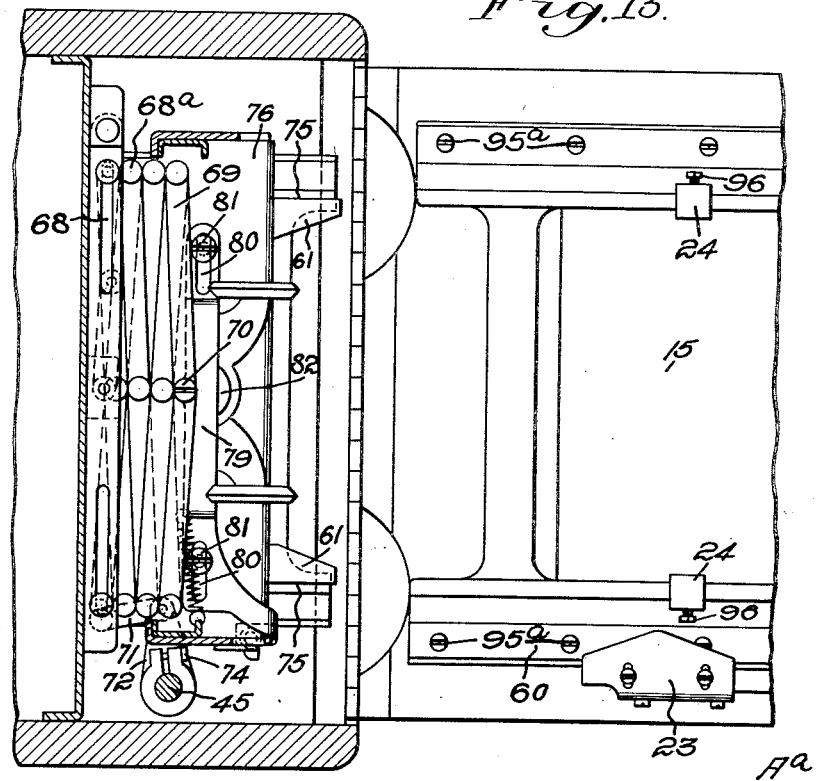
Fig.13.
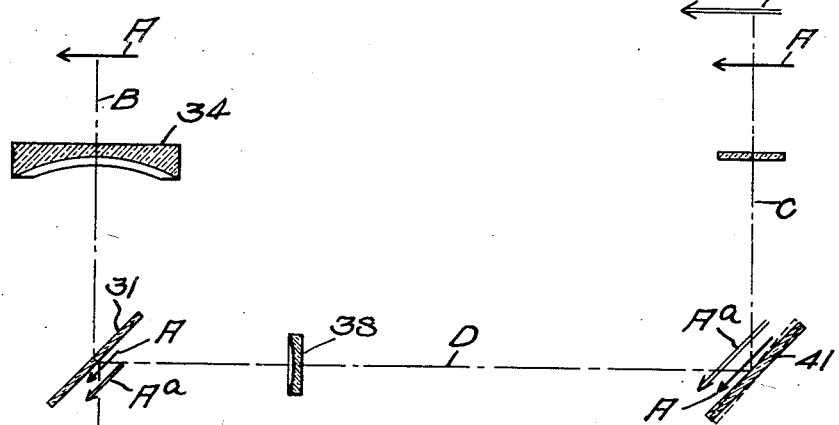
Fig.14.
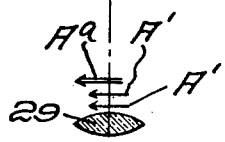
INVENTOR.
Edson S. Hineline
BY
his ATTORNEYS Patented July 25, 1939

2,167,435

UNITED STATES PATENT OFFICE 2,167,435

RANGE AND VIEW FINDER AND CAMERA MECHANISM FUNCTIONALLY EQUIPPED THEREWITH

Edson S. Hineline, Rochester, N. Y., assignor to The Folmer Graflex Corporation, Rochester, N. Y., a corporation of Delaware Application July 23, 1937, Serial No. 155,259

12 Claims. (Cl. 95—44)

This invention relates to a combination range finder and view finder and a means for interconnecting the same so that the range finder adjustment as to distances will correlate with the adjustment of the objective lens in the camera when it is in focus at a like distance; the invention also relates to the camera structure to which the said parts are functionally adapted and applied.

It is well known that there have been invented several different types of range finders and different types of view finders, and that certain types of range finders have been interconnected or caused to track with the lens of a camera. The present invention, however, discloses a unique method of interconnecting the front board or lens carrying member of a camera with a range finder, and it is so constructed that several different lenses can be used on the camera, which lenses can be used at various times in conjunction with the range finder and caused to track therewith. The interconnecting means between the range finder and the front structure or lens carrying structure of the camera is at all times permanently connected, and this interconnecting means is caused to fold or unfold as the camera is extended or compressed.

I will now more fully disclose the operation of the combination range finder and view finder in conjunction with a photographic camera. For purposes of illustration I have chosen to illustrate said finders in connection with the well known "Press" type of camera.

In the drawings:

Fig. 1 is a front elevation of the camera with the door open, showing the placement of the range finder on top of the camera in relation to the front board and the lens;

Fig. 2 is a side elevation of the structure shown in Fig. 1;

Fig. 3 is in part a top plan view, and in part a horizontal section, taken through the range finder and showing the relationship of the various parts of the range finder to the camera working parts;

Fig. 5 is an enlarged detail of the cross arm of the range finder actuating mechanism;

Fig. 6 is a section on line 6—6 of Fig. 5;

Fig. 7 is a section on line 7—7 of Fig. 1;

Fig. 7a is a section on line 7a—7a of Fig. 9;

Fig. 10 is a partial, vertical, longitudinal section through Fig. 1, showing the placement of the range finder actuating mechanism when the camera is focused at a near distance;

Fig. 11 is a detail of Fig. 10 on a larger scale showing more clearly the placement of parts when the camera is focused at a near distance;

Fig. 12 is a section of Fig. 11 on the line 12—12 thereof;

Fig. 13 is a partial, vertical, longitudinal section taken through the camera, showing the placement of the interconnecting mechanism of the range finder when the camera is in a closed position, the parts being collapsed or folded tightly together.

Fig. 13a is a sectional detail on the line 13a—13a of Fig. 10; and

Fig. 14 is a schematic layout or diagram of the various optical parts of the range finder.

Figure 4:
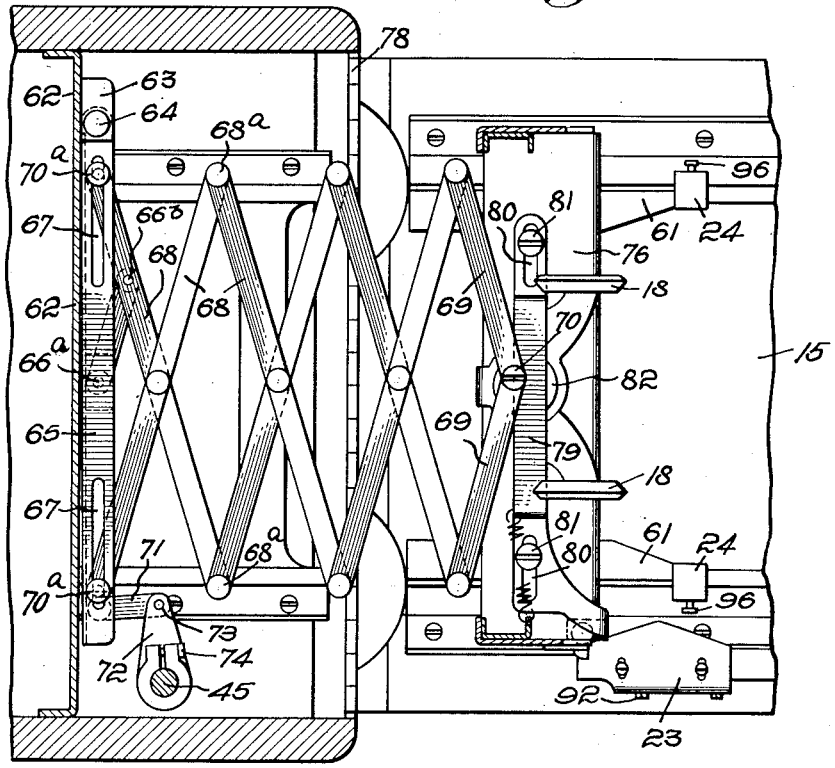
Fig. 4 is a partial, horizontal, longitudinal section through Fig. 1, showing the placement of the range finder actuating mechanism when the camera is focused at or near infinity.

This invention, as hereinbefore pointed out, relates to range and view finders and to camera mechanism functionally equipped therewith.

I am aware that in combination range finders and view finders, it has been proposed to use in the optical group thereof a stationary mirror, and a second mirror which is adjustable as to the angle thereof with respect to the first mirror, and broadly to provide some sort of operative connection between the pivotal support for the movable mirror and the support for the objective lens of the camera, the same being shown in German patent to Alard du Bois-Reymond, No. 188,342, September 23, 1907, and also in the United States patent to Woodbury, No. 1,238,473, August 28, 1917. Such structures, however, and other prior structures known to me, do not provide a construction wherein the range finder mechanism is connected at all times with the movable front of the camera that carries the objective lens, etc., neither do they provide for the use of any one of a plurality of objective lenses of different focal length with the same range finder.

In the ensuing description, I will set forth numerous advantages that flow from my invention, the selected embodiment of which is herein shown. I will also set forth wherein the combined range and view finder herein disclosed itself differs from the prior art. Without limiting my invention to the structure herein disclosed, I will now specifically refer to the selected embodiment or example of my invention.

The box or casing of the camera is indicated at 1 in the various figures wherein the same is shown or indicated. It may be of any suitable character and construction, although it is herein indicated as the so-called "Press" type of camera, commonly known as the "Speed Graphic", to which type of camera my invention is not limited, it being merely the selected embodiment of the invention. The camera shutter which may be of any suitable type is indicated at 2 in Fig. 3 and elsewhere. The shutter set lever is indicated at 3 in Fig. 1, and also in said figure are shown the shutter release lever at 4, the lens board at 5, the upper lens board lock at 6, the lower lens board lock at 7, the side rails at 8, the side rail supports at 9, the camera front board tracks at 10, 10, the camera front board track rack at 11, the focusing knob gear or pinions at 12 in dotted lines, the focusing knob shaft at 13, the focusing knob at 14, and the camera door or bed in its open position at 15.

Other well known parts of the camera structure are indicated in Figs. 2 and 3, which need not be described in detail but which include the camera bellows shown at 16, the camera rising front lock screw at 17, the camera front lock clamp at 18, the shutter winding knob at 19, the shutter release lever at 20, the shutter tension winding knob at 21, the shutter tension releasing pawl at 22, the focusing cam at 23, the so-called infinity stop blocks at 24, as well as a second focusing cam 25. The said two focusing cams I will hereafter refer to in detail. Excepting for the said focusing cams, the parts thus far referred to may be of any usual or suitable structure.

Having thus briefly referred to certain well known parts, I will next refer to the range and view finder structure, which preferably is permanently and rigidly connected to or built into the camera structure, and in this connection I will first refer to Figs. 2, 3, 4 and 7a.

I provide a range finder housing which is shown most clearly at 26 in Figs. 2, 3 and 7a. It is preferably an oblong box-like structure of metal or other suitable material, desirably formed as to the walls thereof in one piece, and it is secured to the top of the camera box or casing by screws 27, shown most clearly in Fig. 3. The said range finder housing is provided with an eye piece, shown at 28 in Figs. 2 and 3, and having a lens indicated at 29 that is held in place by a retaining collar 30. Within the said housing there are provided the parts constituting the optical group and which present a novel combination in that they include a fixed mirror or reflector, a movable mirror or reflector and two fixed negative lenses, in addition to the magnifier lens 29 already referred to. The said parts which are most clearly shown in Fig. 3 and also somewhat diagrammatically in Fig. 14, I will now specifically describe.

The fixed mirror or reflector is shown at 31 in both of said figures. As shown in Fig. 3, it is supported upon the inner wall of the housing 26 by clips 32, 33, suitably secured to said wall. The said mirror 31 is what is known as a semitransparent mirror. In the rear of the said mirror is a view finder or negative lens 34 which is itself held in place by a clip 35 at its upper edge and by a portion of the clip structure 33 at its lower edge.

In the rear of the negative lens 34 is an opening 36 in line with the magnifier lens 29, the mirror 31 and the negative lens 34. At one side of the mirror 31 is secured by screws or otherwise to the inner wall of the housing a bracket 37 which supports a second negative lens 38 provided with a retaining ring 39. Between said negative lens 38 and the movable mirror next to be described there is provided a diaphragm 40 to mask off extraneous light.

The movable mirror to which I have referred is indicated at 41 in Fig. 3. It is shown upon a larger scale in Figs. 8 and 9. It is a so-called first surface mirror. In order to move the same during the operation of functioning of the range finder, the said mirror is carried in a swinging bracket 42, 42a which has a gear sector 43 secured to the frame by screws 43a, and which sector meshes with a small gear 44, also shown in Fig. 7a. The said gear 44 as best shown in Fig. 7a, is fast upon or formed with the upper end of the upright range finder mechanism connecting shaft 45, which extends downward through the top wall of the camera case, as shown in Fig. 7a. The said shaft 45 is shown also in Fig. 1 as permanently positioned in the camera case close to one of the upright walls thereof.

Figures 8, 9:
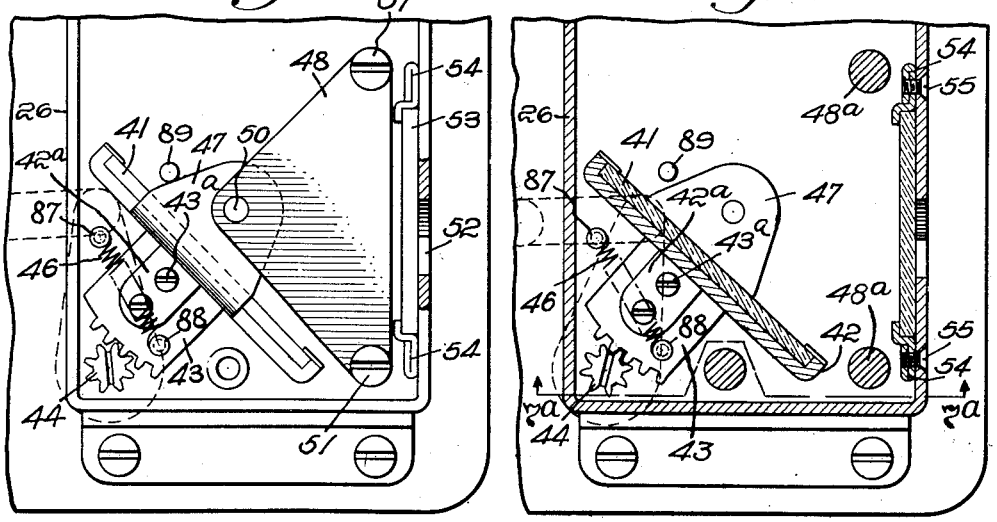
Fig. 8 is a detail of a portion of the range finder as shown in Fig. 3, representing the location of the movable mirror when the camera is focused at or near infinity, the arrangement of the parts of the focusing and the interconnecting mechanism being the same as in Fig. 4.
Fig. 9 is a like detail when the camera is focused at a somewhat nearer point, that is, a point between infinity and the camera, the arrangement of the parts of the focusing mechanism being the same as in Fig. 10.

In order to cause the mirror bracket 42 to return to so-called infinity position, I have provided a coil spring 46. Preferably integral with the bracket 42, I have provided a turned-up lip 47 which, as clearly shown in Figs. 3, 8 and 9, serves as a hinge in conjunction with a thin triangular plate 48 and a pivot pin 50. The said plate 48 is held in position on suitable posts of the range finder housing 26 by screws 51 (Figs. 3 and 8). The said housing in line with the movable mirror 41 is provided with a small opening 52. Overlying the said opening is a glass 53 which is held in place by clamps 54, 54 secured to the wall of said housing by screws 55, 55, shown most clearly in Fig. 9.

So far as I am aware, I am the first to provide in a range finder or like structure an optical group consisting of two fixed negative lenses, a fixed mirror or reflector, a movable mirror or reflector and a magnifier. The said parts are all clearly shown in their relative positions in the housing 26 in Fig. 3. They are also indicated diagrammatically in Fig. 14 and for convenience of description I will now refer to said figure in order that a clear understanding may be had of the operation and functioning of the range and view finder, but will first describe the manner in which the operator focuses the camera.

Having opened the camera in a manner which will be described in detail hereinafter, and having pulled the front of the camera out to so-called infinity position, the user places his eye to the magnifier lens 29 in the tube 28. He finds an image formed upon the negative lens 34. Such image is the exact image in the exact area that the camera will photograph when the exposure is made. There will also be seen by the user a second image in the opening 52 of Fig. 3, which opening, as indicated in Fig. 1, may be of diamond shape. Such second image will be somewhat displaced from the main image seen through the negative lens 34. The procedure for focusing is to turn the knob 14 (Fig. 1) in a clockwise direction until the said diamond shaped image corresponds exactly to the image as viewed on the negative lens 34. That is to say, on the lens 34 will be seen an image covering the entire area of said lens 34 and also there will be seen on said lens 34 a secondary image which is diamond shaped in character, if the opening 52 be of diamond shape. If a vertical line is picked out in the main image on the lens 34 and a corresponding line on the secondary or diamond shaped image, it will be easy for the user to merge said two images.

The procedure of focusing, as previously stated, is to turn the knob 14 until said two images merge, and if the user is focusing on a vertical line, the vertical line, as seen in the diamond shaped image, will exactly overlie the corresponding vertical line in the image on negative lens 34. When said two images actually are superimposed, the camera is in focus.

Referring now to Fig. 14, it is to be understood that in said figure at the top thereof, the black arrow A at the right and left indicates an object at an indefinite distance frequently referred to as infinity. A group or bundle of rays from the left hand arrow A extends in a straight line, as indicated at B, through the negative lens 34, through the fixed mirror 31, and through the magnifier lens 29, to the eye of the user. Extending from the right hand black arrow A is a straight line C, indicating a group or bundle of rays from the same object at infinity or an indefinite distance. However, the line C is in reality at such an angle that the lines B and C meet at the distant object, indicated by the two black arrows A, A of Fig. 14, and which object may be regarded as 200 feet or more from the camera.

An image of the object indicated by the said arrow A (at the left in said diagram, Fig. 14) will be formed on the negative lens 34, will pass through the fixed mirror 31, and will be viewed through the magnifying lens 29 as object A', A', indicated by the small black arrows adjacent the said magnifying lens 29. The right hand black arrow A is, for convenience of illustration and description, also shown (the shaft in double lines) somewhat displaced therefrom at Aa. The image will travel by light rays from the said distant object along the line C, will be reflected by the movable mirror 41, an image will be formed at the lens 38, which will be reflected by the transparent mirror 31, and said image will be viewed through the magnifier lens 29.

Actually two arrows would be seen both exactly overlying each other when the mirror 41 is in the correct angle shown in Fig. 14, in full lines. If, however, the distance of the object were considerably less from the camera than the distance already indicated, the black arrow A at the right would appear to be displaced as indicated by the arrow Aa. In that event, an image of the said arrow Aa would be reflected by the mirror 41, as there shown, an image would be formed by the lens 38, it would be reflected by the mirror 31, and the said image would be viewed as arrow Aa through the magnifier lens 29. Thus the object at the remote arrow Aa would be viewed as displaced in relation to the arrow A. If the mirror 41 were shifted in position, thus changing the angle between the line C and the line D of Fig. 14, the image reflected on the mirror 31 would be again shifted into the position of the arrow A and would be viewed through the magnifier 29 as the two small black arrows A', A', both exactly coinciding with each other.

Thus, it will be evident that by shifting the position of the mirror 41 the images of an object either at a close distance or a far distance (referred to as infinity) can be made exactly to coincide as viewed through the magnifier lens 29.

Having thus described the combined range and view finder, and the manner of fixedly securing the same to the camera, and having referred to the usual parts of that type of camera selected for the reception and application of the combined range finder and view finder, I will describe in detail the preferred structure whereby the said range and view finder is at all times connected to the movable camera front and the means whereby the said range and view finder may be accurately used even though the objective lens of the camera be replaced by another of different focal length.

As shown most clearly in Fig. 3, there is provided a focusing distance scale 56 for a lens of a given focal length, and a like scale 57 for a lens of a somewhat greater focal length. The scale 56 is held in position upon the lens board 5 by screws 58, and the focusing scale 57 is similarly held in place by screws 59, 59. The camera is provided with track guide rails 60 and with track shoes 61, 61 that are permanently attached to the camera front.

I will next describe the preferred means for connecting at all times the range finder with the movable front of the camera, and for this purpose I will refer mainly in Figs. 4, 10, 11, 12 and 13, as well as to details of structures shown in other figures.

In said figures, and particularly clearly in Figs. 4 and 10, there is shown a portion in section of the bellows frame at 62. Attached thereto by a bracket 63 and a rivet 64 is a toggle arm lever or bar 65. The toggle arm centering lever therefor is represented at 66, it being connected to the lever 65 by rivet 66a and to a toggle arm 68 by rivet 66b. The said lever 65 is provided with lengthwise extending slots 67, 67. The several lazytong arms 68 are joined together by rivets 68a, and connected to the outer ends of the outermost of said toggle arms 68 are short lazytong arms 69. The said arms 69 are connected together and to a part to be described by a lazytong anchoring screw 70. The rivets by which the innermost lazytong arms 68 are connected to the lever or bar 65 are indicated at 70a. A connecting link 71 is provided between the lazytong mechanism (which is one form of means for connecting at all times the range finder and the movable front of the camera) and the range finder control shaft arm which is shown at 72 in Figs. 4, 10 and 13. Said link 71 is suitably connected in any way to the lever or bar 65 and is shown as connected to the said arm 72 by a rivet 73. There is also provided a clamp screw 74 for securing the arm 72 upon its shaft 45.

I provide, as clearly shown in Fig. 13, rear camera tracks guides 75 constituting the preferred construction of the embodiment of the invention herein disclosed.

The camera movable front support, which may be of any suitable construction, is most clearly shown at 76 in Figs. 4, 10 and 12. The movable door of the camera, which is shown in a down position in Figs. 3, 4, 10, etc., is indicated at 15, as already stated, and the hinge therefor is indicated at 78 in Figs. 4 and 10.

I have previously referred in connection with Figs. 2 and 3 to the two focusing cams 23, 25. I provide means, which is connected at all times to the said camera front 76, to cooperate with whichever one of said focusing cams 23 or 25 is used, according to the focal length of the camera objective lens. For this purpose I have, as shown most clearly in Figs. 4 to 7 inclusive, 10 and 11, provided a cam follower arm or member 79. The said arm or member is shown as having therein lengthwise extending slots 80 in which are screws 81 for retaining the same in position upon the camera front support 76. The rivet for the camera bed clamp is indicated at 82.

The structural details of the arm or member 79 constituting the cam follower are best shown in Figs. 5, 6 and 7, which, when taken with Fig. 11, clearly indicate how the said arm or member cooperates with either functioning focusing cam 23 or 25. The said arm or member is provided with a hole 84 for the reception of the screw 70 by which the short toggle arms 69 are connected thereto. A preferably bent end portion of the arm or member 79 is provided with a cam follower roller 85 held in position by the screw 86.

As shown most clearly in Figs. 8 and 9, there are provided a pin 87 connected to the range finder housing 26 and a pin 88 connected to the gear sector 43. The coil spring 46, previously referred to, extends between and is supported by the said pins, thus tending to turn the movable mirror 41 into the position for infinity. A stop pin 89 is provided, as best shown in Figs. 8 and 9, to limit the motion of the mirror 41 in a clockwise direction.

The preferred manner of securing the focusing cam 23 in position on the camera bed or door 15 is shown in Fig. 11. It is there represented as attached to the camera bed or door by screws 90, 90 which are received in slots 91, 91 in the said cam. Adjusting screws for the said cam are represented at 92, 92. One of the said rails 8 has a hole 93 therein and the cam follower arm or member 79 is provided with a hole 94, indicated in dotted lines in Fig. 11 and in full lines in Fig. 6. Received in said holes are the ends of a coiled spring 95 by means of which the said bar or member 79 is held with its roll 85 against the cam 23 or the cam 25, as the case may be, and as indicated in dotted lines in Fig. 11.

As shown most clearly in Fig. 12, one of the front board tracks 10 of the camera has a flange-like formation which is received in a groove in the adjacent track guide rail 60, previously referred to. The same construction is provided at both sides of the camera. The said rails 60 are attached to the camera bed by screws 95, shown in Figs. 12 and 13. The infinity stop locks 24, 24, previously referred to, are adjustable on the camera tracks 10 and are held in place by lock screws 96. I will now describe the manner in which a camera is operated that is equipped with a range finder functionally connected therewith at all times.

As shown in Fig. 1 in dotted lines, there is provided a button 97 which, when depressed, causes the pin 98 to contact with the latch 99 and depress it, thus causing a lip 100 to release the latch plate 101 which is shown in Fig. 3 at the extreme right hand end thereof. The door 15 of the camera can then be lowered into the position best indicated in Fig. 2, and the camera front 76 may now be withdrawn from the camera box. The operator grasps the front lock clamps 18 and pulls the camera front outwardly. The track shoes 61 move along the tracks 10 until the said shoes 61 contact with the infinity stops 24, which have previously been set, so that the camera front will be located in a correct position for so-called infinity. That is, the objective lens of the camera will be located in correct relation to the focal plane for a sharp focus at infinity. The camera front will at this time be in the position indicated in Figs. 2 and 4.

The objective lens of the camera can now be moved forward to focus for a near distance by turning the said knob 14 of Fig. 1, so that the gear or pinion 12 which meshes with the rack 11 moves said rack in the proper direction, and in so moving moves therewith the camera tracks 10 together with the track shoes 61, 61 and the camera front support 76 which, as already stated, has mounted therein the lens and shutter 2, the lens board 5, the side rails 8, 8 and the side rail supports 9, 9, as will be readily understood.

I will now describe the manner in which the range finder and its connections to the movable front 76 of the camera function, and in this connection will refer particularly to Figs. 3, 4, 8, 9, 10 and 11. As already pointed out, it is necessary to cause a turning movement on its axis to be imparted to the mirror 41 whenever the relationship of the objective lens is changed with respect to the focal plane of the camera. Such change need take place only during that portion of the lens focal length that is actually used in taking pictures. In the disclosed embodiment of the invention, distances are indicated ranging from five feet to infinity, which may be considered as a distance of one hundred feet or more. In order to cause the proper movements the mechanism constituting the connecting means has been provided, such mechanism being operatively connected at all times to the camera front 76. This is highly desirable in a camera intended to provide for the use of alternative lenses of dierent focal lengths. The camera herein disclosed can be set up to take care of one or more different focal length lenses by merely moving the lens front to its several different positions. The focusing scale 56 of Fig. 3 is one to be used with a 5¼ inch lens, and the scale 57 shown in Fig. 3 is to be used with a 6½ inch lens. It is to be understood that any number of scales may be used if a like number of focusing cams 23, 25 are provided, or if a single variable focusing cam were provided that is adjustable along the bed to the proper point.

The face 102 of the cam 23 is so shaped that when the camera front 76 is moved forward or backward, the roller 85 on the arm or member 79 will in riding therealong cause a lengthwise movement of said arm or member 79 in opposition to the coil spring 95. As the camera front is moved outward the roller 85 is caused to move inward toward the longitudinal center of the camera and compels like movement of the arm or member 79. To the said member 79 is connected by screw 70 the lazytong structure that has been described. The innermost portion of the said lazytong structure is, as has been described, connected to the lever or bar 65 in such manner as to cause the lazytong to fold in a central position. The so-called lazytong structure constitutes one form of connecting means for the purpose, but my invention is not limited to the use of a lazytong structure for the purpose. It will be understood from the foregoing description that if the camera front 76 is moved forward or backward insufficiently to focus, no motion of the lever or bar 65 occurs, the lazytong structure merely collapsing or distending. If, however, longitudinal movement of the arm or member 79 is caused by the cam 23 (or by the cam 25), the entire lazytong structure will be displaced, as shown in Fig. 10, from normal position, in contrast with the normal position of Fig. 4. This causes movement of the lever or bar 65, as indicated in Fig. 10. Any movement of said lever or bar 65 is transmitted to the shaft 45. This is evident from a comparison of Figs. 4 and 10. Such rocking movement of the shaft 45 serves through the pinion 44 to rock the mirror 41.

It will be observed that the permanently positioned arm or member 79 is out of the way of other operating parts, being just above the lower part of the movable camera front 76. It is unnecessary after pulling out the camera front 76 to move manually the arm or member 79 or to make any connection of parts, because it is unnecessary to disassemble or to disconnect any of the parts when closing the camera.

In order to take care of the substitution of an objective lens of different focal length, it is merely necessary either to change the position of the focusing cam 23 lengthwise along the bed, if it be of variable form, or preferably to employ the substitute cam 25, as already described. The cam face 102 of the cam 23 must be of such shape as to cause the proper motion to be transmitted to the shaft 45 and so swing the mirror 41 that it will at all times agree with the various positions of the objective lens with respect to the focal plane.

It will be understood from the foregoing description that the mechanism is simple and rugged and easy to adjust and maintain. When the camera front 76 is returned to its collapsed position, as indicated in Fig. 13, the entire operating mechanism occupies a minimum amount of space and at no time needs any disconnecting and reconnecting of its parts. When the camera is closed, the shoes 61, 61 are received upon the said short guide rails 75, 75, best shown in Fig. 13.

It will be understood that any rotative movement of the shaft 45 is transmitted through the gear 44 and gear sector 43 to the mirror and mirror frame 41, 42, so that as the camera front 76 is moved forward the said mirror 41 is caused to rock about its pivot 50 in a contraclockwise direction, and as the camera front 76 is moved rearward in focusing the same, the mirror 41 is caused to move in a clockwise direction about its pivot 50. The mirror and mirror frame 41, 42 thus are caused to follow any motion of the range finder mechanism and any wear that takes place will be compensated for by the spring 46.

Having thus described one illustrative embodiment of the invention, it is to be understood that although specific terms are employed, they are used in a generic and descriptive sense and not for purposes of limitation, the scope of the invention being set forth in the following claims.

I claim:

1. A range finder and camera mechanism functionally equipped therewith, having in combination, a camera casing provided with a wall adapted to be opened out for use as a bed, said casing having therein a front support for the objective lens movable to and fro for focusing purposes along said bed when so opened out, a range finder attached to said casing in fixed relation, said range finder including two mirrors both afixedly housed upon the camera casing in constant functioning position, means actually mechanically connected at all times (i.e. whether the finder and the camera mechanism are in use or are in closed position out of use), both to the said finder and to the said front support, and constituting an operating connection whereby the focusing of the said objective lens and the functioning of the range finder are simultaneously accomplished, and focusing-cam-means mounted upon the said wall of the camera casing that serves as a bed and so positioned thereon as to act upon said operating connection in the focusing movement of the objective lens.

2. A range finder and camera mechanism functionally equipped therewith having, in combination, a camera casing provided with a wall hinged thereto and adapted to be opened out through a ninety degree angle for use as a bed, said casing having therein a front support for the objective lens movable to and fro for focusing purposes along said bed when so opened out, said front support and cooperating camera parts having means including scale means permitting any one of a plurality of objective lenses of different focal length to be mounted in said front support and when so mounted to function with said range finder, a range finder attached to said camera casing in fixed relation and means actually mechanically operatively connecting at all times said range finder and said front support, to cause the focusing of that one of said objective lenses which is in use and the functioning of the range finder to be simultaneously accomplished, and focusing-cam-means mounted upon the said wall of the camera casing that serves as a bed and so positioned thereon as to act in the focusing movement of the objective lens, upon the said means that operatively connect at all times the range finder and the front support.

3. A range finder and camera mechanism functionally equipped therewith having, in combination, a camera casing provided with a wall adapted to be opened out for use as a bed, said casing having therein a front support for the objective lens movable to and fro for focusing purposes along said bed when so opened out, said front support having means whereby any one of a plurality of objective lenses of different focal length may be mounted thereon, a range finder attached to said casing in fixed relation, means actually mechanically connected at all times (i. e. whether the finder and the camera mechanism are in use or are in closed position out of use) both to the said finder and to the said fixed support and constituting an operating connection whereby the focusing of that one of said objective lenses which is in use and the functioning of the range finder are simultaneously accomplished, and a corresponding series of focusing cams permanently mounted on the said wall used as a bed, so as respectively to act upon said mechanically connected means for the said objective lenses respectively, and by which respectively a range finder is caused to function.

4. A range finder and camera mechanism functionally equipped therewith having in combination a camera casing provided with a wall adapted to be opened out for use as a bed, said casing having therein a front support for the objective lens, movable to and fro for focusing purposes along said bed when so opened out, a range finder attached to the camera casing in fixed relation and having a part movable in the functioning of the range finder, and means actually mechanically connected at all times (i. e. whether the finder and the camera mechanism are in use or are in closed position out of use) both to the said finder and to the said front support and constituting an operating connection whereby the focusing of the said objective lens and the functioning of the range finder are simultaneously accomplished, said mechanically connected means including a member carried by the said front support extending transversely of said support and having movement only in a right line direction, and focusing cam means carried by said bed to act upon said member in such right line direction.

5. A range finder and camera mechanism functionally equipped therewith having in combination a camera casing provided with a wall adapted to be opened out for use as a bed, said casing having therein a front support for the objective lens, movable to and fro for focusing purposes along said bed when so opened out, a range finder attached to the camera casing in fixed relation and having a part movable in the functioning of the range finder, said front support carrying a member extending transversely thereof and of said bed when so opened out, focusing cam means to act upon and move said member in a direction lengthwise of said member, means to confine said member to a right line movement and operating connections at all times connected to said member and to the said movable part of the range finder.

6. A range finder and camera mechanism functionally equipped therewith having in combination a camera casing provided with a wall adapted to be opened out for use as a bed, said casing having therein a front support for the objective lens, movable to and fro for focusing purposes along said bed, a range finder attached to the camera casing and having a part movable in the functioning of the range finder, said front support having an endwise movable member mounted upon the said front support in a position transverse to the said casing wall when opened out as a bed, focusing cam means upon said bed adapted to act upon said member in the positioning of the said front support to move said member in a lengthwise direction, and mechanical connections permanently joining said member and such movable part of the range finder.

7. A range finder and camera mechanism functionally equipped therewith having in combination a camera casing provided with a wall adapted to be opened out for use as a bed, said casing having therein a front support for the objective lens, movable to and fro for focusing purposes along said bed, a range finder attached to the camera casing and having a part movable in the functioning of the range finder, said front support having an element connected thereto with capacity for relative movment, focusing cam means mounted upon said camera wall that when opened out functions as a bed, said focusing cam means being adapted to act upon said element in the positioning of said front support and to move the same, the said range finder having a housing therefor which is fixedly secured to the top of the camera casing, and a shaft having its upper end in said housing and extending down into and supported in the camera casing, said shaft being operatively connected both to said movable element and to such movable part of the range finder, whereby the focusing of the objective lens and the functioning of the range finder are simultaneously accomplished.

8. A camera mechanism having a casing and a range finder affixedly built thereto for permanent connection therewith, said mechanism including a front support for the objective lens that is movable to and fro for focusing purposes, said casing having a wall foldably attached thereto so that it may be opened out for use as a bed, along which the said front support is movable, as stated, for focusing purposes, a range finder permanently, affixedly built to said casing, said range finder having an optical group including a pair of mirrors and an interposed negative lens, one of which said three elements of the optical group is movably mounted in the said structure for range finding purposes, an endwise movable member mounted upon said front support in a position transverse to the said adjacent wall when opened out as a bed, means to restrict said member to an endwise movement thereof in a direction transversely of said bed, mechanical connections permanently joining the movably mounted member of the range finder and the said endwise movable member, and means acting in the focusing of the objective lens upon said endwise movable member, whereby the function of the range finder and the focusing of the objective lens are simultaneously accomplished.

9. A camera mechanism having a casing and a range finder affixedly built thereto for permanent connection thereon, said mechanism including a front support for the objective lens that is movable to and fro for focusing purposes, said casing having a wall foldably attached thereto, so that it may be opened out for use as a bed, along which the said front support is movable, as stated, for focusing purposes, a range finder permanently, affixedly built to said casing, said range finder having an optical group including a pair of mirrors and an interposed negative lens, one of which said three elements of the optical group is pivotally mounted in the said structure for range finding purposes, an endwise movable member mounted at the basal portion of the said front support in a position transverse to the said adjacent wall when opened out as a bed, means to restrict said member to an endwise movement thereof in a direction transversely of said bed, mechanical connections permanently joining the pivotally mounted member of the range finder and the said endwise movable member, and means acting in the focusing of the objective lens upon said endwise movable member, whereby the functioning of the range finder and the focusing of the objective lens are simultaneously accomplished.

10. A camera mechanism having a casing and a range finder affixedly built thereto for permanent connection thereon, said mechanism including a front support for the objective lens that is movable to and fro for focusing purposes, said casing having a wall foldably attached thereto, so that it may be opened out for use as a bed along which the said front support is movable, as stated, for focusing purposes, a range finder permanently, affixedly built to said casing, said range finder having an optical group including a pair of members, one of which is pivoted, and an interposed negative lens, a gear in mesh with the pivotal mounting of the said pivotal mirror, a shaft mounted in an upright position in the camera casing and on which said gear is mounted, an endwise movable member mounted upon said front support in a position transverse to the said adjacent wall when opened out as a bed, means to restrict said member to an endwise movement thereof in a direction transversely of said bed, mechanical connections permanently joining the said shaft and the said endwise movable member, and means acting in the focusing of the objective lens upon said endwise movable member whereby the functioning of the range finder and the focusing of the objective lens are simultaneously accomplished.

11. A camera mechanism having a casing and a range finder affixedly built to the said casing for permanent connection therewith, a housing at the top of the camera wherein the said range finder is positioned, said camera mechanism including a front support for the objective lens that is also movable to and fro for focusing purposes, said casing having a wall foldably attached thereto so that it may be opened out for use as a bed along which the said front support is movable, as stated, for focusing purposes, said range finder having an optical group including a movable member, gearing connected to the said movable member of the optical group, a shaft upright in said camera casing and carrying a member of said gearing, said shaft extending from the housing at the top of the camera substantially to the base of the camera and located closely adjacent to an upright wall of the camera inside the casing, an endwise movable member mounted upon the said front support in a position transverse to the said casing wall when the latter is opened out as a bed, and mechanical connections permanently joining the movable member of the optical group and the said endwise movable member, and means acting in the focusing of the objective lens upon said endwise movable member, whereby the functioning of the range finder and the focusing of the objective lens are simultaneously accomplished.

12. A range finder and camera mechanism functionally equipped therewith, having in combination, a camera casing provided with a wall adapted to be opened out for use as a bed, said casing having therein a front support for the objective lens movable to and fro for focusing purposes along said bed when so opened out, a range finder attached to said casing in fixed relation, said range finder including two mirrors both fixedly housed upon the camera casing in constant functioning position, focusing-cam-means mounted upon the said wall of the camera casing that serves as a bed, a movable element upon said front support and adapted, in the range finding operation, to move along, and itself to be moved by, said focusing-cam-means, and mechanical connections between said movable element and the said finder, whereby the focusing of the objective lens and the functioning of the range finder are simultaneously accomplished.

EDSON S. HINELINE.